No. 729,703. PATENTED JUNE 2, 1903.
J. URRUTIA Y MOTTA.
MEANS FOR INDICATING THE IMPACT OF BODIES AT A DISTANCE.
APPLICATION FILED OCT. 28, 1901.
NO MODEL.
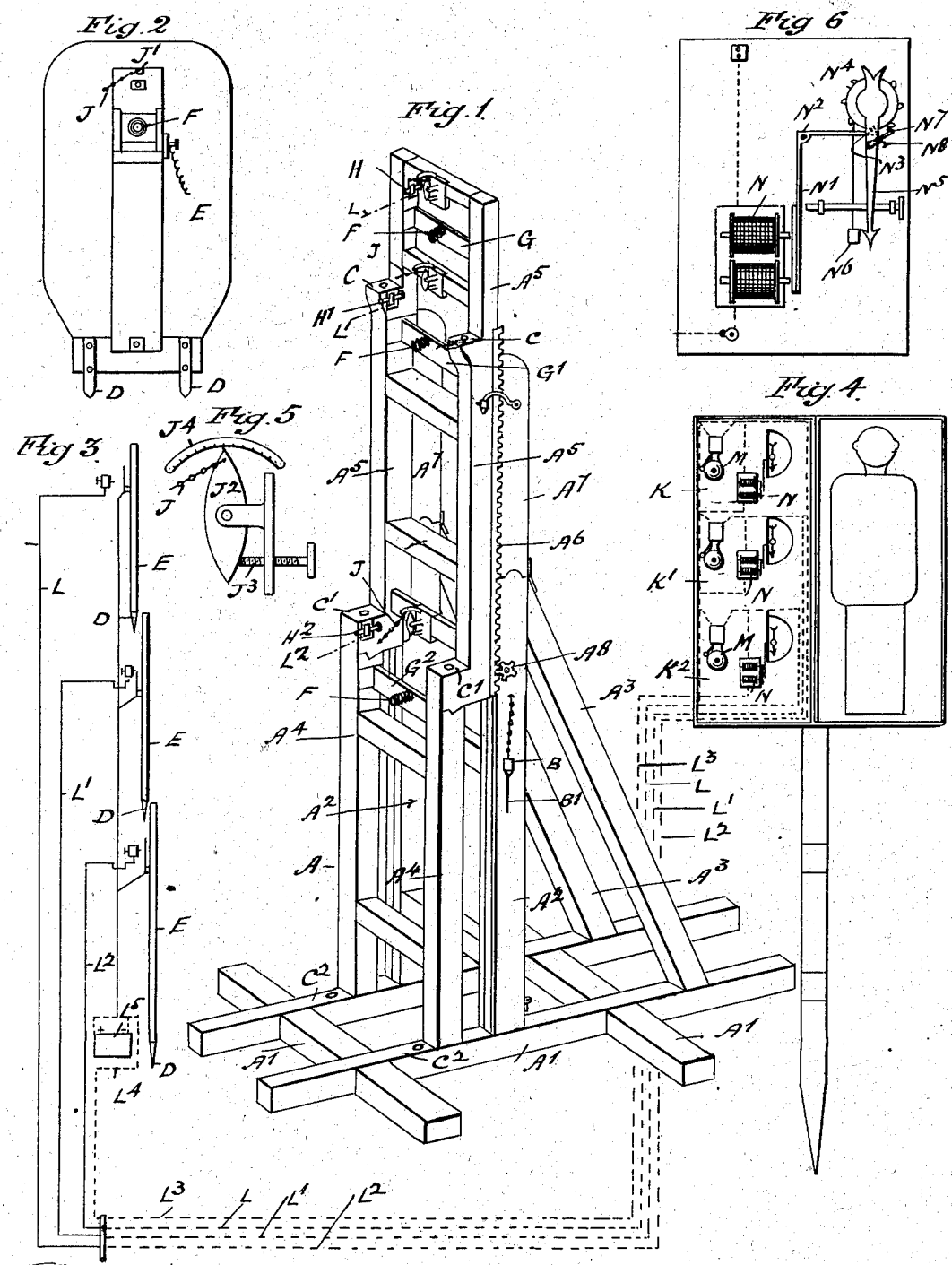

No. 729,703. Patented June 2, 1903.

UNITED STATES PATENT OFFICE.

JUAN URRUTIA Y MOTTA, OF GETAFE, NEAR MADRID, SPAIN.

MEANS FOR INDICATING THE IMPACT OF BODIES AT A DISTANCE.

SPECIFICATION forming part of Letters Patent No. 729,703, dated June 2, 1903.

Application filed October 28, 1901. Serial No. 80,380. (No model.)

*To all whom it may concern:*

Be it known that I, JUAN URRUTIA Y MOTTA, a subject of the King of Spain, residing and having my post-office address at Getafe, near Madrid, Spain, have invented certain new and useful Improvements in Means for Indicating the Impact of Bodies at a Distance, of which the following is a specification.

This invention relates to means for indicating the impact of bodies at a distance, and is particularly applicable as a recording-target or as a phonometer. I will describe it in relation to a target, by way of example.

To carry the invention into effect, I arrange one or more vertical plates having knife edges or points at their lower part, which rest upon suitable bearing plates or blocks. Each plate is maintained in a vertical position by means of spiral springs, one end of each spring being attached to the back of the target-plate, while the other end is attached to a vertical frame arranged at the back of the said plate. Means are provided to vary the strength or range of motion of the said springs according to the force of impact of the projectile or the wind-pressure. Means are also provided to check the movement of the plate preferably in relation to a graduated scale. Each plate carries an adjustable contact-piece adapted to make electrical connection with another contact-piece carried by the frame. Each contact is connected by a line-wire leading to an indicator at the point of observation, so that each plate has a separate indicator. The indicator consists of a pointer mounted on an axis adapted to rotate under the action of weight or spring. This axis carries a toothed wheel, which forms part of an escapement mechanism controlled by an electromagnet, the coils of which are coupled up in series in the line-wire.

The operation of the device is as follows: When a projectile strikes the plate, it causes it to oscillate with an amplitude proportional to the moment of the impact about the axis of movement of the plate. Thus the number of contacts made by the electrical contact-point will indicate the effect of the blow on the plate, and at each contact a current passes along the line and allows the indicator to move through the angular distance of one tooth. For example, with a given distance and projectile one contact may mean the plate has been hit near the bottom or axis, two contacts the center portion, and three contacts the top portion of the plate. As the amplitude of vibration is limited, the difference in the effect of impacts farther from or nearer the fulcrum of the plate, respectively, is represented by a variation in the number of vibrations before the system comes again to rest.

In the annexed drawings, Figure 1 is a perspective view of the frame of a target to hold three target-plates one above the other in the general form of outline of a man. Fig. 2 is an elevation of the rear side of one of the removed target-plates. Fig. 3 is a diagrammatic view in side elevation, representing the target-plates in position and illustrating the electrical connections. Fig. 4 is a front elevation of the indicating mechanism, showing also the electrical connections with corresponding parts of the target-frame and targets. Fig. 5 is a detail view of part of Fig. 1. Fig. 6 is a detail view of part of Fig. 4.

A is a frame, the detail construction of which is unimportant. In the example illustrated it consists of a base $A'$, carrying uprights $A^2$ $A^2$, propped vertically by struts $A^3$ $A^3$, and folding pieces $A^7$, hinged to the tops of the uprights.

$A^4$ is a removable frame for supporting the frame $A^5$ when raised to the position shown. Frame $A^5$ slides on uprights $A^2$ $A^2$ and is raised by rack-and-pinion gear $A^6$ $A^8$.

B is a plumb-bob, and $B'$ a mark on the frame in relation thereto for ascertaining that the frame is duly placed, so that the targets will be upright.

C C $C'$ $C'$ $C^2$ $C^2$, respectively, are pallets in which rest the pointed fulcra D D, in which the targets oscillate. Each target E, Fig. 2, has two such fulcra D D at its base. At a suitable place on the back of each target E is attached one end of a helical spring F, the other end of which is attached to a cross-bar G, $G'$, or $G^2$, respectively, on the frame. Each target is thus resiliently connected to the frame in such a way that on receiving an impact it vibrates upon its fulcra to and from the frame, according to the vibration of said spring. Its vibration toward the frame is limited by the abutment-screw H, H', or H², respectively, and its vibration away from the frame is likewise limited by a chain J, attached at one end to the target, as at J', Fig. 2, and at the other to the frame by adjustable means—for example, as shown in Fig. 5, where it is attached to a lever J², governed by a set-screw J³ and adjustable thereby according to a scale J⁴. Abutment-screws H H' H² may also serve as electrical contacts and are respectively in connection with an equivalent number of indicators K K' K² by means of separate wires L L' L². A common return-wire L³ leads from the indicators to the targets at L⁴. L⁵ is a source of electricity. Each indicator comprises a signal-bell M, an electromagnet N, an armature N', pivoted at N² and integral with a detent N³.

N⁴ is a ratchet-wheel carrying an indicating-pointer N⁵ and adapted to be rotated by cord and weight N⁶ or other equivalent mechanism. N⁷ is a pivoted detent.

The operation of these devices is as follows: The target-frame is set up at the desired place and targets adjusted thereon. The indicator is placed near the firing-point and electrically connected to the targets and frame. If a shot is now fired and strikes one of the target-plates, the plate is set in more or less violent vibration, according as the shot struck it higher or lower—that is to say, farther from or nearer to its fulcrumed lower edge. It will thus complete a greater or less number of oscillations before the energy of the impact has been expended and the plate comes again to rest. Each oscillation is represented on the indicator by an audible sounding of the bell belonging to the particular target-plate that was struck and by an attraction of the corresponding armature N', which withdraws the detent N³ and suffers the wheel N⁴ to revolve one tooth's space, the released tooth being caught by the detent N⁷, moved into place by the said movement of detent N³. On return of detent N³ detent N⁷ is released by its spring N⁸, and detent N³ arrests the next tooth. Each oscillation of the target-plate thus corresponds to a movement of the finger N⁵ through one division.

I am aware that hinged targets have been used which when struck by a bullet rock on their hinges and drop down; but I am not aware that any target has been used which is so supported that it rocks to and fro for an indefinite number of times at each impact, the amplitude of vibration being proportional to the force of the impact, as in the present target.

I therefore claim—

1. The combination with an oscillatory target-plate adapted to vibrate back and forth when struck and to return to its normal position, of means located in the path of oscillation of said plate at a definite distance from the normal position of said plate and adapted to produce a temporary contact when said plate abuts thereon, and an indicator operated by said temporary contact for the purpose set forth.

2. The combination with an oscillatory target-plate adapted to vibrate back and forth when struck, and to return to its normal position, of means adjustably located in the path of oscillation of said plate at a distance from the normal position of said plate, and adapted to produce a temporary contact when said plate abuts thereon, and an indicator operated by said temporary contact for the purpose set forth.

3. The combination with an oscillatory target-plate adapted to vibrate back and forth when struck, and to return to its normal position, of an electric contact device located in the path of oscillation of said plate at a definite distance from the normal position of said plate, and adapted to produce a temporary contact when said plate abuts thereon, a distant indicator adapted to be operated by said temporary contact for the purpose set forth, a source of electricity and a circuit connection for said contact device, indicator and source of electricity.

4. The combination with a target-plate adapted to oscillate on an inferiorly-placed axis, means for resiliently supporting said plate in normal position, means located in the path of oscillation of said plate at a definite distance from the normal position of said plate, and adapted to produce a temporary contact when said plate abuts thereon, and an indicator operated by said temporary contact for the purpose set forth.

In witness whereof I have signed this specification in the presence of two witnesses.

JUAN URRUTIA Y MOTTA.

Witnesses:
 BENITO ARNBLYN,
 EMILIO VARGUEZ.